T. O. WERNER.
THRUST COLLAR FOR SHAFTS.
APPLICATION FILED JUNE 25, 1914.
1,175,100.                                                        Patented Mar. 14, 1916.
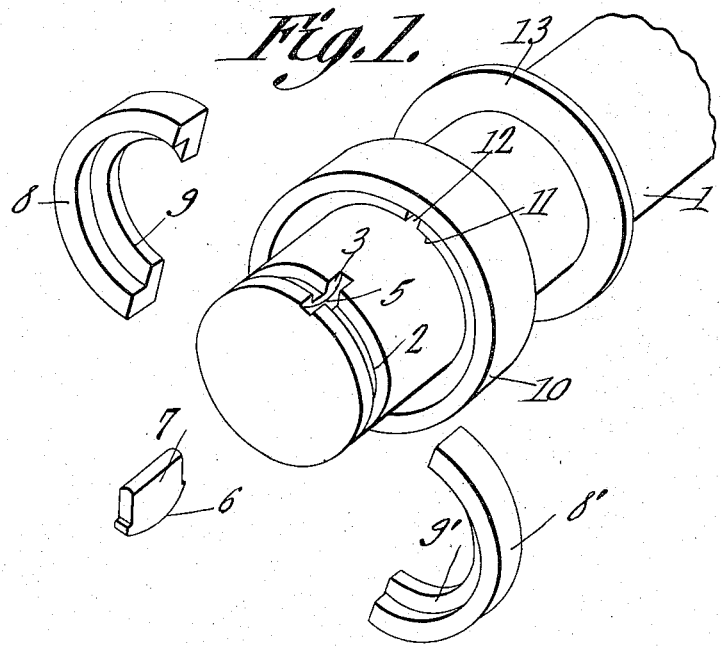
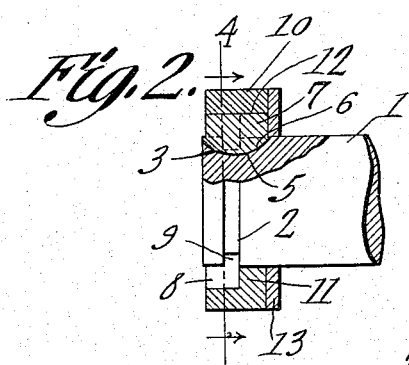
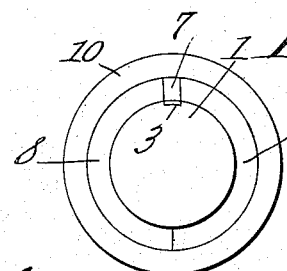
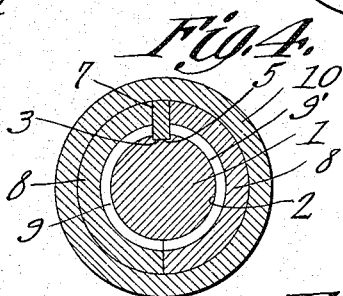
Witnesses
T. O. Werner
Inventor
by C. A. Snow & Co.
Attorneys

UNITED STATES PATENT OFFICE.

THOMAS O. WERNER, OF BANGOR, PENNSYLVANIA.

THRUST-COLLAR FOR SHAFTS.

1,175,100.  Specification of Letters Patent.  Patented Mar. 14, 1916.

Application filed June 25, 1914. Serial No. 847,268.

*To all whom it may concern:*

Be it known that I, THOMAS O. WERNER, a citizen of the United States, residing at Bangor, in the county of Northampton and State of Pennsylvania, have invented a new and useful Thrust-Collar for Shafts, of which the following is a specification.

The present invention relates to improvements in a boltless thrust collar for shafts, one object of the invention, being the provision of a thrust collar adapted to be fitted upon a shaft, and so held without bolts as to be locked against outward displacement and at the same time to dispense with the use of set screws or keys as is the usual practice.

A further object of the present invention, is the provision of a boltless thrust collar, composed of a plurality of members, such members combining to assist each other in locking the thrust collar upon the shaft so that the same is held against circumferential and outward movements relatively to the shaft.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a perspective view of the complete collar, the parts being separated relatively to the carrying shaft. Fig. 2 is a side elevation partly in section of one end of the shaft with the present thrust collar shown in section thereupon. Fig. 3 is a front elevation of the complete device assembled. Fig. 4 is a section taken on line 4—4 of Fig. 2.

Referring to the drawings, the numeral 1 designates the shaft which in the present instance is adjacent the end, although it may be at any point throughout the longitudinal length thereof, provided with the circumferential groove 2 and with the transversely disposed slot 3, the ends of which are disposed upon opposite sides of the groove 2 with the bottom of the slot curved as at 5 which at its greatest depth is greater than that of the groove 2. This slot is provided for the reception of the curved lower end 6 of the locking key 7.

The two sections 8 and 8', when assembled with the reduced portions 9 and 9' seated within the circumferential groove 2, have portions terminating adjacent the side walls of the slot 3 so that the key 7 when inserted as shown in Figs. 2, 3 and 4 lock the sections 8 and 8' against circumferential displacement and thus form with the adjacent portions of the sections, a complete ring.

In order to provide a means for locking the sections 8 and 8' and the key 7 against outward displacement, and itself also be locked against circumferential displacement, an annular member 10 which is provided with the shaft engaging rim 11 is provided, said rim 11 being provided with the recess 12 for seating upon the portion of the key 7 that projects inwardly from the groove 2 to the rear of the sections 8 and 8'.

In order to provide a bearing plate for the wheel (not shown) or any other member that is mounted upon the shaft 1 and held against end thrust by means of the present device, a washer 13 is disposed for abutment against the inner face of the annular member 10 to seal the opening or recess 12.

It is obvious where more than two sections 8—8' are employed, that one key 7 will be added for each section added, thus three sections will require two keys 7.

It will thus be seen that by making the annular member 10 L-shaped in cross section, that the various parts of the present thrust collar are held together without the use of bolts, as is the usual practice.

What is claimed is:

In a thrust bearing, a shaft having an annular groove and an intersecting radial key seat having a wall at each end, a key insertible radially into the key seat, a split ring seated in the annular groove and engaging the sides of the key, and an annulus upon the shaft and thrusting against one side of the split ring and straddling the key, said annulus housing the ring to hold it in the groove and extending over and beyond the groove, said ring having a flange filling the space between said extended portion of the annulus and the shaft, said key constituting means for holding the annulus against rotation relative to the shaft.

In testimony that I claim the foregoing as my own, I have hereto affixed my signature in the presence of two witnesses.

THOMAS O. WERNER.

Witnesses:
S. DAVID TSHUDY,
ROSCOE J. APP.

Copies of this patent may be obtained for five cents each, by addressing the "Commissioner of Patents, Washington, D. C."